United States Patent Office 3,016,493
Patented Jan. 9, 1962

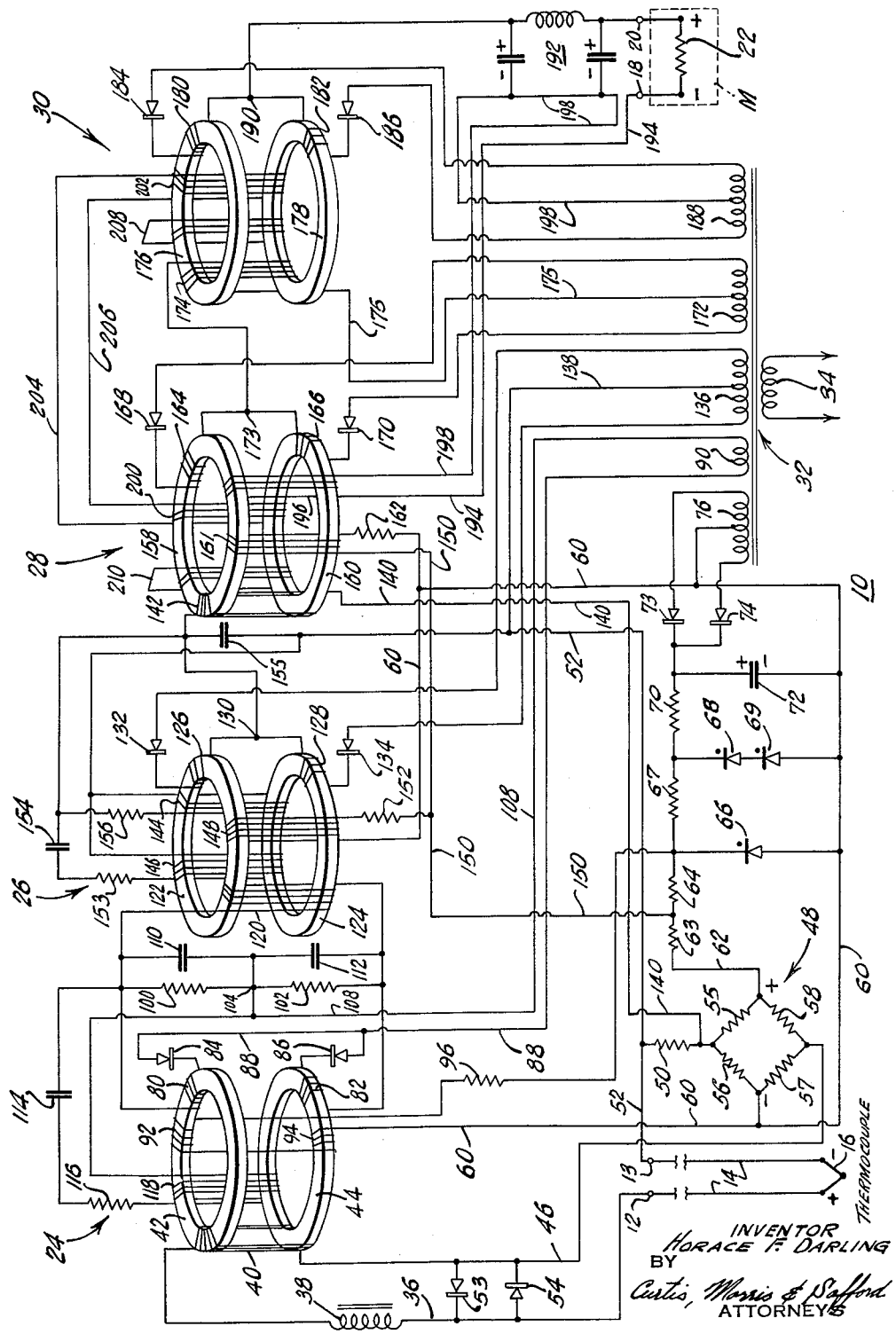

3,016,493
ELECTRIC-SIGNAL CONVERTING APPARATUS
Horace E. Darling, North Attleboro, Mass., assignor to
The Foxboro Company, Foxboro, Mass.
Filed Sept. 11, 1958, Ser. No. 760,392
1 Claim. (Cl. 330—8)

This invention relates to improved electric-signal converter apparatus comprising amplifier equipment suitable for use in industrial control systems where very precise, accurate, and stable operation is required.

An object of this invention is to provide rugged and reliable amplifying apparatus which is compatible with various types and models of standard instrumentation equipment in many different kinds of installations.

Another object is to provide such apparatus which is very accurate and stable in operation but which is relatively simple and inexpensive.

These and other objects will in part be understood from and in part pointed out in the description given hereinafter.

In the art of electrically measuring and/or controlling industrial processes, the value of one or more physical variables such as temperature, pressure, etc. is sensed by an appropriate transducer, e.g. a thermocouple, and converted into an electric signal proportional to the physical variable. However, because the more reliable and practical transducers presently available have very low conversion efficiencies, and hence produce output signals at very low level, it is usually necessary to greatly amplify these signals before they can be applied to standard recording and indicating instruments. This requires an amplifier which not only has high gain but, since accuracy is important, also has stability and linearity. The present invention provides an improved amplifier of this kind which moreover is very versatile in its application.

In accordance with the present invention there is provided a magnetic amplifier circuit having a relatively high input impedance and a relatively low output impedance. This makes it possible, without affecting the accuracy or calibration of the amplifier, to connect a thermocouple or similar transducer to the input of the amplifier directly or to connect it to the input by a pair of leads several miles long. On the other hand, the output of the amplifier can be connected to any one or a number of different recording or control instruments, also without affecting accuracy or calibration. The input terminals and the output terminals of this circuit are electrically isolated from each other so that either input terminal may be grounded without regard to which output terminal may be grounded. The versatility of the apparatus is thus considerably enhanced.

A better understanding of the invention together with a fuller appreciation of its many advantages will best be gained from a study of the following description given in connection with the single figure of the drawing which shows a magnetic amplifier circuit embodying features of the invention. Certain portions of the circuit described herein are disclosed and claimed in the inventor's copending application U.S. Serial No. 724,056, filed March 26, 1958.

The circuit, generally indicated in the drawing at 10, has at the left a pair of input terminals 12 and 13 which are connected via a two-wire line 14, having for example a length anywhere from a few feet to several miles, to the hot junction 16 of a thermocouple, terminals 12 and 13 comprising the cold junction. If desired, either one, or neither, of terminals 12 and 13 may be grounded. As seen on the right in the drawing, circuit 10 has a pair of output terminals 18 and 20 which are adapted to be connected to a receiving device M having an internal resistance indicated by resistor 22. Either one of output terminals 18 and 20 may be grounded without regard to grounding of input terminals 12 and 13.

Circuit 10 includes an input amplifier stage generally indicated at 24, an intermediate stage generally indicated at 26, a second intermediate stage generally indicated at 28, and an output stage generally indicated at 30. Each of these stages comprises a magnetic amplifier the detailed operation of which will be explained shortly. Energizing power is applied to these stages from a common transformer 32 having a number of secondary windings and a primary winding 34 adapted to be connected to a regulated source (not shown) of 60 cycle, 117 volt power.

The signal derived from the hot junction 16 of the thermocouple and applied to input terminals 12 and 13 is very small (a few millivolts at several hundred ohms resistance) and it must be greatly amplified before it can be applied to device M. This is accomplished by the four magnetic amplifier stages 24, 26, 28, and 30 which are feedback-connected with each other, as will be explained, in a unique and advantageously way so that their operation is very accurate and remains so over a wide range of conditions, such as variable temperature and changes in source resistance or output load resistance.

Input terminal 12 is connected via a lead 36 and through a filter inductor 38 to one side of the input windings 40 of stage 24. This winding encircles a first toroidal core 42 and a second toroidal core 44, both of which are of saturable magnetic material. The other side of input windings 40 is connected to a lead 46, the other end of which connects to one corner of a temperature compensating bridge generally indicated at 48. The opposite corner of the bridge is connected to a feedback resistor 50 whose upper end is connected by one end of a lead 52 to input terminal 13. During operation of the circuit a negative feedback voltage is developed across resistor 50 and since this resistor is in series with input winding 40, the effective input impedance at terminals 12 and 13 is made very high (of the order of 10,000 ohms). As a consequence, a change of several miles in the length of line 14, which will change the effective resistance of the thermocouple by several hundred ohms, will not substantially affect the accuracy or calibration of the circuit. As a safety precaution to prevent excessive voltage from being applied to winding 40, leads 36 and 46 are shunted together by a diode 53 and a diode 54 poled in opposite direction and each having a forward minimum conduction voltage of about ½ volt.

Temperature compensating bridge 48 includes a temperature variable resistor 55, a zero balance resistor 56, and two equal, low value resistors 57 and 58. The juncture of resistors 56 and 57 is connected to a negative voltage lead 60 and the juncture of resistors 55 and 58 to a positive lead 62. This last is energized through a decoupling resistor 63 and a temperature compensating resistor 64 by a regulated voltage developed across a Zener diode 66, resistor 64 functioning to minimize changes in this voltage because of changes in diode 66 with temperature. Diode 66 is energized through a dropping resistor 67 with a second regulated voltage developed across two Zener diodes 68 and 69 in series. These in turn are supplied with direct current from a dropping resistor 70, a filter capacitor 72 and two rectifiers 73 and 74 each of which is connected in series with a respective end of a secondary winding 76 of transformer 32. The center top of this winding is connected to negative lead 60.

The toroidal cores of magnetic amplifier 24 carry respective output windings 80 and 82 which are energized simultaneously through corresponding identical rectifiers 84 and 86 connected via lead 88 to one end of a secondary winding 90 on transformer 32. These output windings 80 and 82 are wound in opposite phase sense so that at a given instant the flux induced in one of the cores 42 and 44 will be in one direction and the flux induced in the other in the opposite direction. A pair of bias windings 92 and 94 are also wound in opposite sense to each other on cores 42 and 44 and are energized in series with direct current through negative lead 60 and a current limiting resistor 96, the other end of which is connected to the positive side of Zener diode 66.

The currents flowing through the respective output windings 80 and 82 are fed to a balanced load consisting of a pair of resistors 100 and 102 connected in series opposition with their common point 106 returned by lead 108 to the other end of secondary winding 90. These load resistors are provided with respective shunt filter capacitors 110 and 112.

When the cores 42 and 44 are magnetized to an equal extent, as by means of the bias winding 92 and 94, the impedances presented by the respective output windings 80 and 82 will be equal and, with equal energization by the transformer secondary winding 90, the currents through these output windings will be equal. Consequently, with equal currents flowing through the output windings 80 and 82, there will be no differential voltage developed across the balanced load represented by the load resistors 100 and 102.

The input winding 40, being wound about both of the cores 42 and 44, will produce flux which opposes the magnetization of one of these cores and aids the magnetization of the other core. Assuming, for example, that the direction of current through this input winding is such as to increase the flux in the upper core 42 and decrease the flux in the lower core 44, then the upper core will saturate at an earlier point in the A.-C. energizing cycle than the lower core. Accordingly, more current will flow through the upper load resistor 100 than through the lower load resistor 102. Since these load resistors are connected in series-opposition, there will be developed across them a D.-C. voltage having a magnitude proportional to the magnitude of the current in the input winding 40. The polarity of this voltage is, of course, determined by the direction of the current flow through the input winding.

It should be noted that amplifier 24, by virtue of this differential winding arrangement, effectively avoids instability due to line voltage changes. For example, if there is an increase in the voltage produced by the power transformer secondary winding 90, there will be a corresponding increase in current through the output windings 80 and 82, but this increase in current will not produce any change in output voltage because the load resistors 100 and 102 are connected in series-opposition. Similarly, any small change in current through the bias windings 92 and 94 will affect the magnetization of cores 42 and 44 equally, so that any resulting change in current through the output windings 80 and 82 again will be equal and hence balanced out by the opposed load resistor arrangement. To further assure stability of operation, the cores of this amplifier advantageously are formed of ring-shaped laminae mounted in a rigid metal box of annular shape as set forth in the inventor's co-pending application U.S. Serial No. 540,783, filed October 17, 1955, now Patent No. 2,918,619.

To improve the stability of amplifier 24, and to minimize hunting, a small amount of the signal generated across load resistor 100 is fed back as positive rate feedback, through a capacitor 114 and a resistor 116 to a winding 118 encircling both cores 42 and 44 in the same sense.

The D.-C. voltage developed across load resistors 100 and 102 is applied to an input winding 120 of amplifier 26, this winding encircling both cores 122 and 124 of the amplifier in the same direction. Also wound about these cores respectively is a pair of output "gate" windings 126 and 128 connected together at a common point 130.

These gate windings 126 and 128 are energized, through corresponding rectifiers 132 and 134, by a center-tapped secondary winding 136 of power transformer 32. The center-tap of the winding 136 is connected through a lead 138 to lead 52 and the upper side of negative feedback resistor 50. The lower side of this resistor is connected through a lead 140 to one side of an input winding 142 of stage 28, the other side of this winding being connected back to common point 130. Thus, the output direct current from stage 26 flows in series through input winding 142 and feedback resistor 50. The polarity of the voltage developed across resistor 50 by this current is opposite to that of the voltage from the thermocouple at terminals 12 and 13, and this greatly increases the effective impedance at these terminals.

The output circuit for magnetic amplifier stage 26 is a balanced full-wave arrangement wherein the gate windings 126 and 128 are energized during alternate half-cycles of the A.-C. energizing source. During the "firing" half-cycle (i.e. the half-cycle during which current flows) for either gate winding, the voltage across the winding builds up sinusoidally until the magnetic material of the corresponding core 122 or 124 saturates. At this point in the cycle, the voltage across the gate winding drops essentially to zero, and current flows from the transformer 32 and through the input winding 142 of the next magnetic amplifier stage 28 for the remainder of the half-cycle. The rectifiers 132 and 134 are polarized in such a manner that the current flowing through this input winding 142 will always be in the same direction, and it will be apparent that the average magnitude of the current will vary in accordance with changes in the point of the A.-C. energizing cycle at which saturation of the cores occurs.

The point in the energizing cycle at which saturation of cores 122 and 124 occurs is determined primarily by the magnitude of the signal current through the input winding 120 of stage 26. For example, an increase in this current will cause the cores to saturate earlier in the energizing cycle, and thus a correspondingly larger average output current will flow through the gate winding 126 and 128 and the next stage input winding 142. In addition, the saturation point is influenced by a first feedback winding 144, a second feedback winding 146, and by a bias winding 148 which is supplied with regulated D.-C. current by a lead 150 and by negative lead 60. The magnitude of the bias current is set by a current-limiting resistor 152.

The function of feedback winding 146 is similar to that of feedback winding 118 in the preceding stage 24. Only changes in the D.-C. average output voltage from stage 26 are applied to winding 146, this winding being connected in series with a current limiting resistor 153 and a coupling capacitor 154 across winding 142 and resistor 50 in series. A filter capacitor 155 is connected in parallel with the latter two elements.

The function of feedback winding 144 in stage 26 is to adjust the gain of the stage. This winding, in series with a current-limiting resistor 156, is direct connected across the output of the stage.

The third magnetic amplifier stage 28 also includes a pair of identical toroidal cores 158 and 160 of saturable magnetic material, arranged in a manner similar to the cores previously described. Cores 158 and 160 are biased by a D.-C. current to the required magnetic state by a winding 161 energized from leads 150 and 60 and having a current limiting resistor 162 in series with it. Cores 158 and 160 also carry respective output gate windings 164 and 166 which are connected, with rectifiers 168 and 170, as a balanced full-wave output circuit energized by another center-tapped secondary winding 172 on the transformer 32.

The gate windings 164 and 166 are connected together at a common point 173, from which the D.-C. output current flows into an input winding 174 of the following stage 30. The other side of this winding is connected through a lead 175 to the center-tap of transformer secondary 172. Amplifier stage 28 operates in substantially the same way as the second stage 26, the output direct current flowing from stage 28 into winding 174 being proportional to the signal current in input winding 142 of stage 28.

The final magnetic amplifier stage 30 similarly includes a pair of identical toroidal cores 176 and 178 of saturable magnetic material. These cores are biased to the required magnetic state by the output direct current flowing from stage 28 into winding 174 so that no separate bias winding is required. Cores 176 and 178 also carry respective output gate windings 180 and 182 which are connected with rectifiers 184 and 186, as a balanced full-wave output circuit energized by a center-tapped secondary winding 188 on transformer 32.

The gate windings 180 and 182 are connected together at a common point 190, from which the D.-C. output current flows through a "pi" filter 192, output terminal 20 and into device M. The current fed to this device is returned from the output terminal 18 through a lead 194 to one side of a feedback winding 196 encircling both cores of stage 28. The other side of this winding is connected through a lead 198 which returns to the center tap of transformer secondary winding 188. Thus, output current flowing into device M is circulated through feedback winding 196, this current acting in proper phase to reduce the output impedance across terminals 18 and 20. Therefore, regardless of the value of resistance 22, within a relatively wide range, the output current will be determined substantially only by the signal on input terminals 12 and 13.

The final stage of magnetic amplification 30 operates in a manner similar to that of the stages previously described. That is, the level of current flowing through the input winding 174 primarily determines the point in the A.-C. energizing cycle at which the cores 176 and 178 saturate, and accordingly controls the average magnitude of the D.-C. current flowing through the gate windings 180 and 182 to device M. The filter 192 serves in the usual way to smooth out fluctuations in this output current.

The magnetic amplifier stages 28 and 30 are provided with stabilizing windings 200 and 202, respectively, which are connected together through a pair of wires 204 and 206. This stabilizing circuitry provides coupling for alternating current (primarily second harmonic) signals between the third and fourth stages 28 and 30 of the magnetic amplifier so as effectively to eliminate any tendency of the amplifier to oscillate or "hunt," and also to produce an essentially flat frequency response without the usual resonant peaks. In operation, any change in flux through the third stage cores 158 and 160 produces a corresponding voltage in the stabilizing winding 200, and this voltage in turn causes a transient flow of current through the stabilizing winding 202 which tends momentarily to dampen the operation of the fourth amplifier stage 30, i.e. to delay the transmission of a signal through the two amplifier stages in a manner analogous to mechanical dashpot action. To minimize feedback from the second stabilizing winding 202 to the first stabilizing winding 200, the fourth stage cores 176 and 178 are provided with a short-circuit winding 208 which serves to absorb second-harmonic components in these cores and prevents harmful interaction between the two amplifier stages 28 and 30. Similarly, the third stage cores 158 and 160 are provided with a shorted winding 210 to prevent harmful interaction between stages 26 and 28.

In the amplifying circuit 10 which has now been described, there is no direct current path or connection between the input terminals and the output terminals. However, a direct voltage of the order of a few millivolts applied to the input will produce an output direct current of the order of 10 to 50 milliamperes at very low effective impedance. The circuit is accurate and linear in its operation and remains so over a wide range of temperature. Device M may be merely a recording instrument or it may be an electrical or electrical-mechanical device conventionally used for controlling an industrial process. Resistance 22 may be about 600 ohms and is much larger than the effective output impedance at terminals 18 and 20.

The above description of the invention is intended in illustration and not in limitation. Various modifications or changes in the embodiment set forth may occur to those skilled in the art and these can be made without departing from the spirit or scope of the invention.

I claim:

An industrial process instrumentation system wherein the value of a process condition is sensed by a low-voltage D.-C. signal source such as a thermocouple or the like, and wherein a relatively high-powered D.-C. measurement current corresponding to the voltage of said signal source is produced in series transmission to one or more remote indicating or control devices presenting various load impedances; said system including transmitter apparatus to be connected to said signal source over a two-wire input line of variable length and adapted to produce a linearly corresponding measurement current over a two-wire output line without establishing conductive continuity between said input and output lines and without drawing any substantial current from said signal source, said transmitter apparatus comprising first and second high-gain magnetic amplifier sections each having input and output windings, an input circuit for connecting said first section input winding to said two-wire input line to receive the signal from said low-voltage signal source; a first negative feedback circuit responsive to the current in said first section output winding and conductively connecting said first section output winding to said input circuit to develop a D.-C. feedback voltage in series-opposition to the D.-C. signal from said signal source, said first feedback circuit being effective to substantially minimize variations in input current through said first section input winding due to variations in length of said two-wire input line and also to linearize the correspondence between the input and output of said first section magnetic amplifier; circuit means connecting said first section output winding to said second section input winding; a feedback winding for said section section magnetic amplifier and conductively isolated from said second section input winding, output circuit means for connecting said second section output winding to said two-wire output line to transmit thereto a relatively high-powered measurement current; and a second negative feedback circuit responsive to the measurement current in said two-wire output line, said second feedback circuit being conductively connected to said feedback winding to produce in said second section magnetization changes that are nearly equal but opposite to the magnetization changes developed by variations in the current flowing in said second section input winding, said second feedback circuit being effective to substantially minimize variations in the measurement current flowing in said two-wire output line due to variations in the impedance presented by said indicating and control devices and also to assure linearity between said measurement current and the current flowing through said second section input winding, thereby establishing linear correspondence between the output of said signal source and said measurement current without introducing any conductive continuity between said input and output lines.

References Cited in the file of this patent

UNITED STATES PATENTS

| | | |
|---|---|---|
| 2,464,639 | FitzGerald | Mar. 15, 1949 |
| 2,477,729 | FitzGerald | Aug. 2, 1949 |
| 2,730,574 | Belsey | Jan. 10, 1956 |
| 2,810,877 | Silver | Oct. 22, 1957 |
| 2,831,160 | Guth | Apr. 15, 1958 |
| 2,853,675 | Estrada et al. | Sept. 23, 1958 |
| 2,886,765 | Hetzler | May 12, 1959 |

OTHER REFERENCES

Geyger: Magnetic Amplifier Circuits, published by McGraw-Hill Book Co., Inc., New York, Jan. 29, 1954, pages 68–70 and 190.

UNITED STATES PATENT OFFICE

CERTIFICATE OF CORRECTION

Patent No. 3,016,493 January 9, 1962

Horace E. Darling

It is hereby certified that error appears in the above numbered patent requiring correction and that the said Letters Patent should read as corrected below.

Column 6, line 61, for "section", first occurrence, read -- second --.

Signed and sealed this 19th day of June 1962.

(SEAL)
Attest:

ERNEST W. SWIDER
Attesting Officer

DAVID L. LADD
Commissioner of Patents